(12) United States Patent
Gupta et al.

(10) Patent No.: US 11,683,262 B2
(45) Date of Patent: Jun. 20, 2023

(54) GROUP-BASED POLICIES FOR INTER-DOMAIN TRAFFIC

(71) Applicant: Cisco Technology, Inc., San Jose, CA (US)

(72) Inventors: Anubhav Gupta, Fremont, CA (US); Rex Fernando, Fremont, CA (US); Sanjay Kumar Hooda, Pleasanton, CA (US); Syam Sundar Appala, Santa Clara, CA (US); Samir Thoria, Saratoga, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 120 days.

(21) Appl. No.: 16/697,016

(22) Filed: Nov. 26, 2019

(65) Prior Publication Data

US 2021/0160175 A1 May 27, 2021

(51) Int. Cl.
*H04L 45/302* (2022.01)
*H04L 12/28* (2006.01)
*H04L 45/74* (2022.01)
*H04L 47/20* (2022.01)

(52) U.S. Cl.
CPC ........ *H04L 45/302* (2013.01); *H04L 12/2854* (2013.01); *H04L 45/74* (2013.01); *H04L 47/20* (2013.01)

(58) Field of Classification Search
CPC ....... H04L 45/30; H04L 45/302; H04L 45/64; H04L 45/74; H04L 47/20; H04L 12/2854; H04L 45/02; H04L 45/745
See application file for complete search history.

(56) References Cited

U.S. PATENT DOCUMENTS

| 5,440,541 | A  | * | 8/1995  | Iida ..................... | H04M 3/4228 |
|           |    |   |         |                          | 455/461     |
| 9,467,478 | B1 | * | 10/2016 | Khan .................. | H04L 63/0209 |
| 10,715,427| B2 | * | 7/2020  | Raj ........................ | H04L 45/48 |
| 10,855,575| B2 | * | 12/2020 | Theogaraj ............. | H04L 47/726 |
| 10,862,758| B2 | * | 12/2020 | Sethi .................. | H04L 41/0823 |

(Continued)

OTHER PUBLICATIONS

Dunbar et al., "BGP Usage for SDWAN Overlay Networks", Jul. 23, 2019, IETF Network Working Group, draft-dunbar-bess-bgp-sdwan-usage-02, pp. 1-25 (Year: 2019).*

(Continued)

*Primary Examiner* — Christine Ng
(74) *Attorney, Agent, or Firm* — Baker Botts L.L.P.

(57) ABSTRACT

In one embodiment, a method includes receiving a data packet from a first host located in the first site, where the data packet may be destined to a second host located in a second site that may be different from the first site, determining that an identifier of a second group to which the second host belongs is not available at the first network apparatus, sending a request for an identifier of the second group to a second network apparatus, where the request may comprise an address of the second host, receiving a response comprising the identifier of the second group from the second network apparatus, determining that the second group is a destination group, applying one or more policies associated with the destination group to the data packet, and causing the data packet to be routed to the second host.

19 Claims, 7 Drawing Sheets

(56) References Cited

U.S. PATENT DOCUMENTS

| | | | |
|---|---|---|---|
| 2005/0091313 A1* | 4/2005 | Zhou | H04L 63/101 |
| | | | 709/204 |
| 2006/0233173 A1* | 10/2006 | Pullela | H04L 12/4641 |
| | | | 370/392 |
| 2016/0135045 A1* | 5/2016 | Lee | H04L 9/08 |
| | | | 726/9 |
| 2017/0026417 A1 | 1/2017 | Ermagan | |
| 2018/0367459 A1 | 12/2018 | Chandrasekaran | |
| 2020/0076683 A1* | 3/2020 | Hegde | H04L 41/0895 |
| 2020/0236042 A1* | 7/2020 | Gafni | H04L 12/4641 |
| 2021/0044565 A1* | 2/2021 | Moreno | H04L 45/586 |
| 2021/0112034 A1* | 4/2021 | Sundararajan | H04L 47/726 |

OTHER PUBLICATIONS

International Search Report and Written Opinion for International Application No. PCT/US2020/060332, dated Feb. 17, 2021.

* cited by examiner

(12) United States Patent
US 11,683,262 B2

GROUP-BASED POLICIES FOR INTER-DOMAIN TRAFFIC

TECHNICAL FIELD

The present disclosure relates generally to a field of data communications, and more particularly, to constructing policies based on groups for inter-domain traffic.

BACKGROUND

Enterprise Software-Defined (SD)-Wide Area Network (WAN) (SD-WAN) fabrics are made up of edge routers with multiple virtual private networks (VPNs) utilizing point-to-point encryption overlay tunnels (e.g., IPsec). These tunnels traverse one or more underlay networks utilizing a variety of connection methods (e.g., dedicated MPLS links, broadband internet or cellular networks). Edge routers and intermediate routers within an SD-WAN may apply SD-WAN policies to a data packet while the data packet is routed from the source to the destination. The SD-WAN policies may be determined based on a source group to which the source node belongs and/or a destination group to which the destination node belongs.

DESCRIPTION OF EXAMPLE EMBODIMENTS

Overview

In particular embodiments, a first network apparatus configured to operate at a first site of a network may receive a data packet from a first host located in the first site. The first network apparatus may be a Wide Area Network (WAN)-edge router connected to the network. The network may be a Software-Defined (SD)-WAN comprising a plurality of sites. The data packet may be destined to a second host located in a second site that may be different from the first site. The data packet may comprise an identifier of a first group to which the first host belongs as a source group. A switch connected to the first host may add the identifier of the first group. The switch connected to the first host may learn the identifier of the first group during an authentication process of the first host. The first network apparatus may determine that an identifier of a second group to which the second host belongs is not available at the first network apparatus. Determining that the identifier of the second group is not available may comprise searching a local database at the first network apparatus. The first network apparatus may send a request for an identifier of the second group to a second network apparatus in response to the determination. The request may comprise an address of the second host. In particular embodiments, the request may be a control message sent over Overlay Management Protocol (OMP). In particular embodiments, The request may be a control message sent over Web Socket. The first network apparatus may receive a response comprising the identifier of the second group from the second network apparatus in response to sending the request for the identifier of the second group. The first network apparatus may determine that the second group is a destination group based on the received identifier. The first network apparatus may apply one or more policies associated with the destination group to the data packet. The one or more policies may be associated with the source group. The one or more policies may comprise at least one of an admission control, a routing-path selection, a security policy, or a Quality of Service (QoS) policy. The one or more policies may comprise a traffic policing, where a pre-determined maximum data rate is enforced. The first network apparatus may cause the data packet to be routed to the second host. The first network apparatus may receive a second data packet destined to the first host from the second host. The first network apparatus may identify a source group identifier based on a source group identifier field in the second data packet. The first network apparatus may determine that the source group identifier is not identical to the identifier of the second group in the local database. The first network apparatus may update the identifier of the second group in the record with the source group identifier in response to the determination. In particular embodiments, the second network apparatus may be a WAN fabric control plane. The second network apparatus may maintain group identifiers associated with hosts in the network. In particular embodiments, the second network apparatus may be a WAN-edge router configured to operate at the second site. The second network apparatus may determine the identifier of the second group by communicating with a local fabric control plane associated with the second site.

In particular embodiments, a first network apparatus that is configured to operate at a first site of a network may comprise one or more processors and one or more computer-readable non-transitory storage media coupled to one or more of the processors. The one or more computer-readable non-transitory storage media may comprise instructions operable when executed by one or more of the processors to cause the first network apparatus to receive a data packet destined to a second host located in a second site from a first host located in the first site. The first site and the second site may be different. The processors may be operable when executing the instructions to send a request for an identifier of a second group to which the second host belongs to a second network apparatus. The request may comprise an address of the second host. The processors may be operable when executing the instructions to receive a response comprising the identifier of the second group from the second network apparatus in response to sending the request for the identifier of the second group. The processors may be operable when executing the instructions to determine that the second group is a destination group based on the received identifier. The processors may be operable when executing the instructions to apply one or more policies associated with the destination group to the data packet. The processors may be operable when executing the instructions to cause the data packet to be routed to the second host.

In particular embodiments, one or more computer-readable non-transitory storage media may embody software that is operable on a first network apparatus configured to operate at a first site of a network when executed to receive a data packet destined to a second host located in a second site from a first host located in the first site. The first site and the second site may be different. The software may be operable when executed to send a request for an identifier of a second group to which the second host belongs to a second network apparatus. The request may comprise an address of the second host. The software may be operable when executed to receive a response comprising the identifier of the second group from the second network apparatus in response to sending the request for the identifier of the second group. The software may be operable when executed to determine that the second group is a destination group based on the received identifier. The software may be operable when executed to apply one or more policies associated with the destination group to the data packet. The software may be operable when executed to cause the data packet to be routed to the second host.

Example Embodiments

Figure 1:
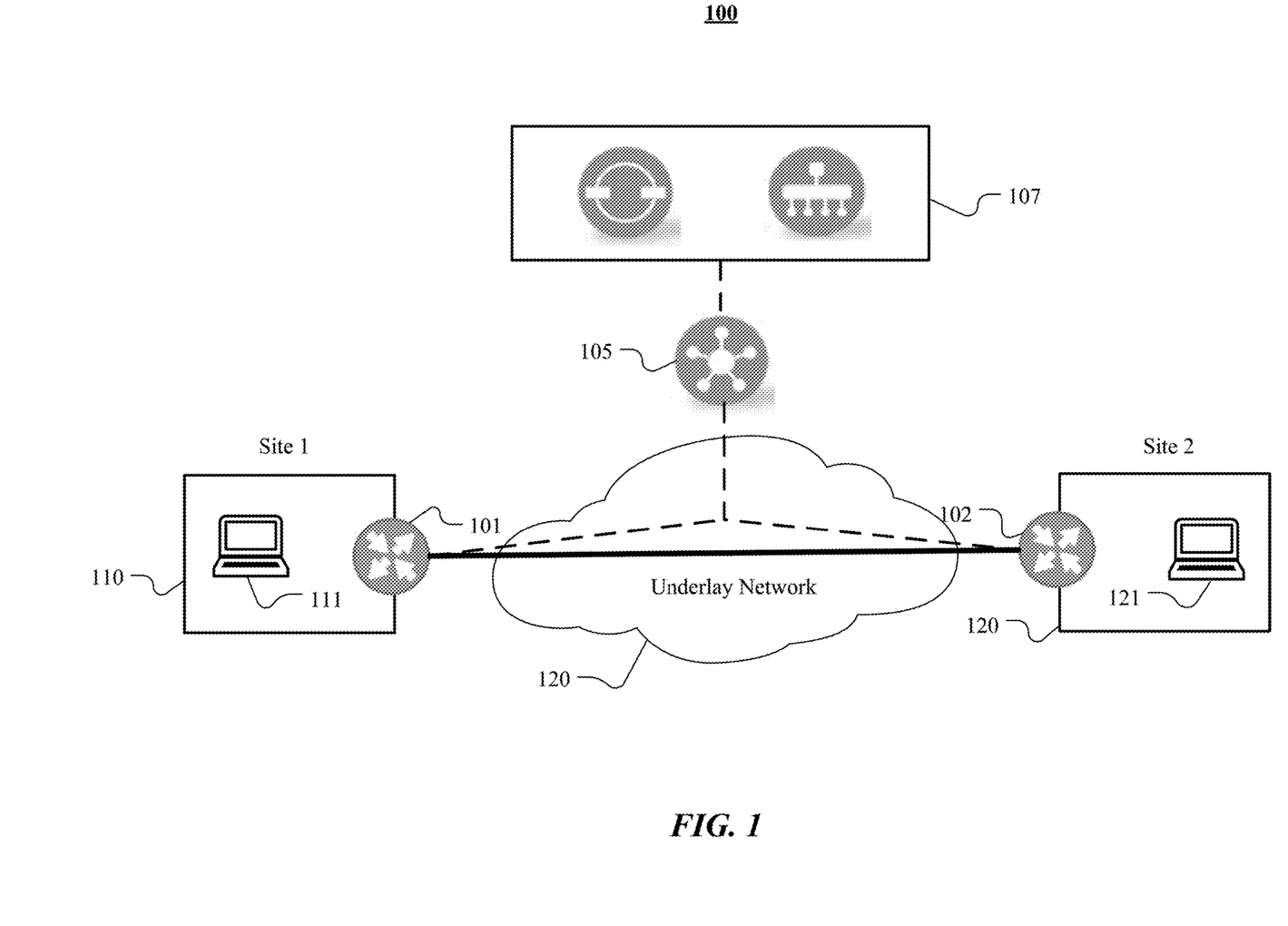
FIG. 1 illustrates an example architecture of an SD-WAN.

FIG. 1 illustrates an example architecture of an SD-WAN. In particular embodiments, a network 100 may be a Software-Defined (SD)-Wide Area Network (WAN) which is a virtual overlay network based on tunnels that carry traffic between a plurality of sites over one or more underlay networks 130. The example illustrated in FIG. 1 shows two sites: a first site 110 and a second site 120. Each site may connect to the network 100 via one or more WAN-edge routers. For example, the first site 110 connects to the network 100 through an edge router 101, and the second site 120 connects to the network 100 through an edge router 102. A site connected to the network 100 may have a data plane connection to each of the other sites through Internet Protocol Security (IPSec) tunnels. The edge routers 101 and 102 may have a data plane connection over the underlay network 130. The underlay network 130 may comprise Multiprotocol Label Switching (MPLS), Internet, and cellular networks. An SD-WAN control plane may comprise a controller 105 that may maintain a centralized routing table and the routing policies to program the forwarding behavior of the data plane. The controller 105 may maintain direct control plane connection to each edge router. The controller 105 may provision, maintain, and secure the entire overlay network. The SD-WAN network 100 may also comprise management/orchestration plane 107. Although this disclosure describes a SD-WAN network in a particular manner, this disclosure contemplates a SD-WAN network in any suitable manner.

In particular embodiments, the first site may comprise a first host. The first host may belong to a first group. A switch to which the first host is connected may learn an identifier of the first group. The switch may add the identifier of the first group as a source group to data packets originated from the first host. In particular embodiments, the switch may learn the identifier of the first group using one of one or more dynamic mechanisms. In particular embodiments, the first host may perform an authentication procedure. The switch may learn the identifier of the first group during the authentication procedure of the first host.

Figure 2:
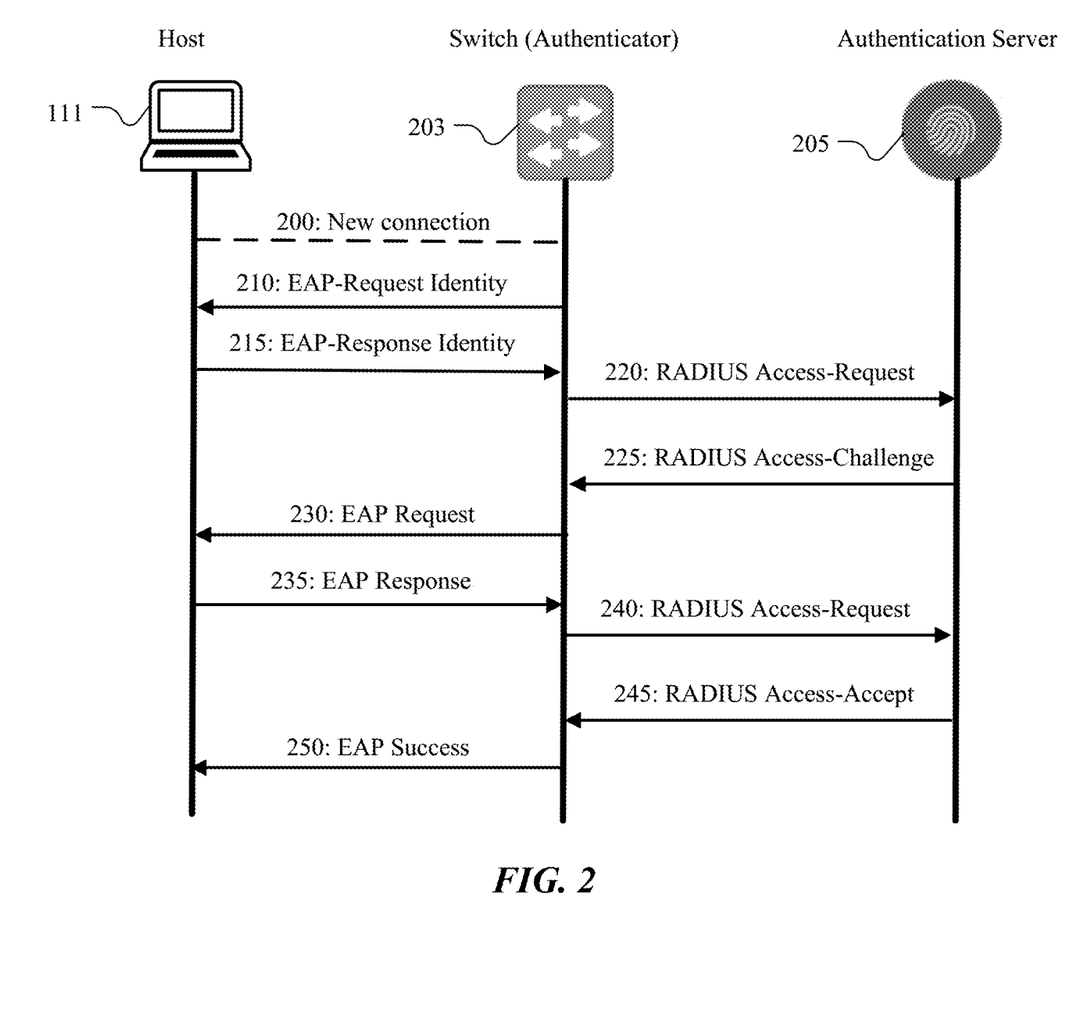
FIG. 2 illustrates an example authentication procedure for a host.

FIG. 2 illustrates an example authentication procedure for a host. As an example and not by way of limitation, illustrated in FIG. 2, a first host 111 may be activated at step 200. The switch 203 may detect the first host 111 and may enable a port connected to the first host 111 in an "unauthorized" state. The "unauthorized" state may only allow 802.1X traffic, while other traffic may be dropped. At step 210, the switch 203 may initiate an authentication by periodically transmitting Extensible Authentication Protocol (EAP)-Request Identity frames to a special Layer 2 address (01:80:C2:00:00:03) on the local network segment. The first host 111 may listen on this address. On receipt of the EAP-Request Identity frame, the first host 111 may, at step 215, respond with an EAP-Response Identity frame containing an identifier for the first host 111 such as a User ID. At step 220, the switch 203 may encapsulate the Identity response received from the first host 111 in a RADIUS Access-Request packet and may forward the RADIUS Access-Request packet to an authentication server 205. At step 225, the authentication server 205 may send a reply (encapsulated in a RADIUS Access-Challenge packet) to the switch 203. At step 230, the switch 203 may encapsulate the EAP Request in an EAP Over LAN (EAPOL) frame and transmit the EAPOL frame to the first host 111. At step 235, the first host 111 may send an EAP response to the switch. At step 240, the switch may encapsulate the received EAP Response in a RADIUS Access-Request packet and forward the RADIUS Access-Request packet to the authentication server 205. At step 245, the authentication server may respond with either an EAP-Success message (encapsulated in a RADIUS Access-Accept packet). The EAP-Success message may comprise an identifier of a first group to which the first host belongs. The switch 203 may learn the identifier of the first group from the EAP-Success message. The switch 203 may forward the EAP-Success message to the first host 111 at step 250. On receiving the EAP-Success, the switch 203 may set the port to the "authorized" state and may allow normal traffic. The switch 203 may add the identifier of the first group to data packets originated from the first host 111. In particular embodiments, the switch 203 may learn the identifier of the first group using one of one or more static mechanisms. In particular embodiments, the switch 203 may maintain a mapping table between IP addresses and their corresponding groups. The switch 203 may learn the identifier of the first group based on an IP address associated with the first host 111. Although this disclosure describes learning an identifier of a group to which the first host belongs in a particular manner, this disclosure contemplates learning an identifier of a group to which the first host belongs in any suitable manner.

In particular embodiments, the source edge router 101 may receive a data packet from a first host 111 located in the first site 110. The data packet may be destined to a second host 121 located in a second site 120. The first site 110 may be apart from the second site 120. The first site 110 and the second site 120 may be connected through the SD-WAN network 100. The switch 203 connected to the first host 111 may add the identifier of the first group as the source group to the data packet, thus the data packet may comprise the identifier of the first group. The source edge router 101 may update local database with a mapping of an IP address of the first host 111 and the identifier of the first group in the data packet. As an example and not by way of limitation, the first host 111 located in the first site 110 may belong to an HR group in an enterprise. The group identifier for the HR group may be 1000. The first host 111 may send a data packet to the second host 121 located in the second site 120. The second host 121 may belong to an engineering group in the enterprise. The group identifier for the engineering group may be 2000. The switch 203 connected to the first host 111 may add the group identifier 1000 to the data packet. The data packet may arrive at the source edge router 101 that connect the first site 110 to the SD-WAN network 100. The source edge router 101 may update the local database with a mapping of the IP address of the first host 111 and the group identifier 1000 for the HR group. Although this disclosure describes receiving a data packet comprising a source group identifier in a particular manner, this disclosure contemplates receiving a data packet comprising a source group identifier in any suitable manner.

In particular embodiments, the source edge router 101 may determine that an identifier of a second group is not available at the source edge router 101, where the second group is a group to which the second host 121 belongs. In particular embodiments, the source edge router 101 may determine whether the identifier of the second group is available at the source edge router 101 by searching a local database at the source edge router 101. As an example and not by way of limitation, continuing with a prior example, the source edge router 101 may try to determine the identifier of the second group upon receiving the data packet from the first host 111 to the second host 121. The source edge router 101 may look-up the IP address of the second host 121 to identify the identifier of the second group. The source edge router 101 may determine that the identifier for the second group is not available when no record for the IP address of the second host exists in the local database. Although this disclosure describes determining that an identifier for the destination group of a data packet is not available at the source edge router in a particular manner, this disclosure contemplates determining that an identifier for the destination group of a data packet is not available at the source edge router in any suitable manner.

In particular embodiments, the source edge router 101 may, in response to the determination, send a request for an identifier of the second group to a second network apparatus. The request may comprise an address of the second host. Although this disclosure describes sending a request for an identifier for a destination group in a particular manner, this disclosure contemplates sending a request for an identifier for a destination group in any suitable manner.

Figure 3:
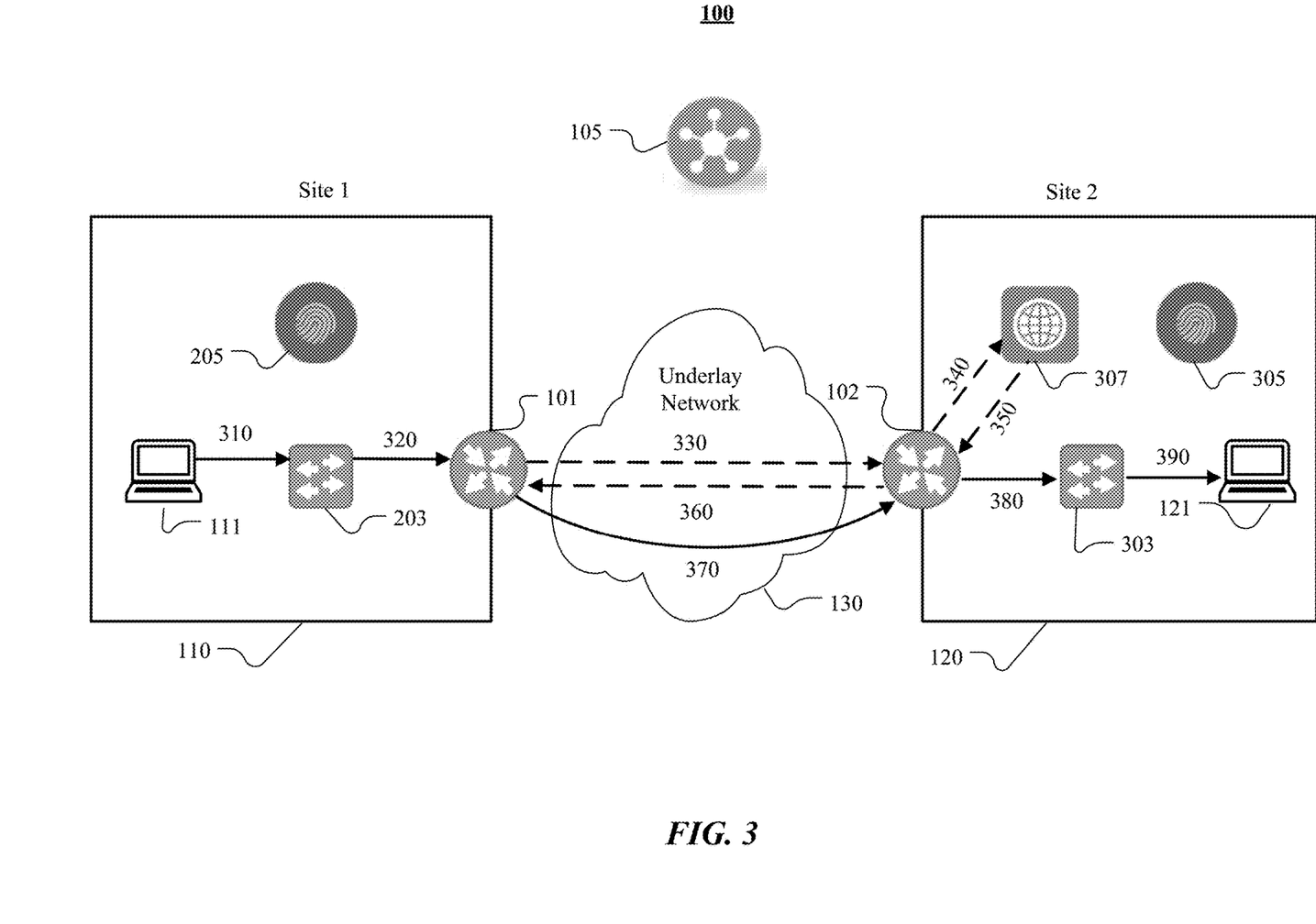
FIG. 3 illustrates an example flow for fetching a destination group from a destination edge router.

FIG. 3 illustrates an example flow for fetching a destination group from a destination edge router. In the example illustrated in FIG. 3, the first host 111 may send a data packet to the second host 121. The first host 111 may be located in the first site 110. The second host 121 may be located in the second site 120. The first host 111 may belong to an HR group in an enterprise. The group identifier for the HR group may be 1000. The second host 121 may belong to an engineering group in the enterprise. The group identifier for the engineering group may be 2000. At step 310, the data packet may be forwarded to the switch 203 that is connected to the first host 111. The switch 203 may add the identifier 1000 for the HR group to the data packet. The switch 203 may have learned the identifier for the HR group during the authentication procedure of the first host 111. At step 320, the switch 203 may forward the data packet to the source edge router 101 that connects the first site 110 to the SD-WAN network 100. The data packet may comprise the identifier 1000 for the HR group.

In particular embodiments, the second network apparatus may be a WAN-edge router 102 configured to operate at the second site 120. The second network apparatus may determine the identifier of the second group by communicating with a local fabric control plane controller 307 associated with the second site 120. The source edge router 101 may receive a response comprising the identifier of the second group from the second edge router 102. The source edge router 101 may determine that the second group is a destination group based on the received identifier. As an example and not by way of limitation, continuing with a prior example illustrated in FIG. 3, the source edge router 101 may send a control message to the destination side WAN-edge router 102. The control message may comprise a destination IP address of the data packet at step 330. The destination edge router 102 may look-up its local database to find an identifier of a destination group to which the second host 121 belongs. If the destination group is not available in the local database, the destination edge router 102 may query a local fabric control plane controller 307 at step 340. The local fabric control plane controller 307 may have learned the destination group identifier 2000 for the engineering group from an authentication server 305 located in the second site 120. At step 350, the local fabric control plane controller 307 may send a response to the destination edge router 102. At step 360, the destination edge router may send a control message to the source edge router 101, where the control message may comprise the identifier 2000 for the engineering group. Upon receiving the control message, the source edge router 101 may determine that the engineering group is the destination group. As the source edge router 101 knows both the source group identifier and the destination group identifier, the source edge router 101 may apply one or more appropriate policies to the data packet. At step 370, the source edge router 101 may forward the data packet to the destination edge router 102 through the underlay network 130. The destination edge router 102 may forward the data packet to the switch 303 connected to the second host 121 at step 380. The switch 303 may forward the data packet to the second host 121 at step 390. Although this disclosure describes fetching a destination group identifier from a destination edge router in a particular manner, this disclosure contemplates fetching a destination group identifier from a destination edge router in any suitable manner.

In particular embodiments, the request sent at step 330 and the response sent at step 360 may be control messages sent over Overlay Management Protocol (OMP). OMP is a newly introduced protocol that forms the heart of an overlay network. OMP is a protocol that runs inside the Transport Layer Security (TLS) or Datagram Transport Layer Security (DTLS) tunnels formed between the edge router and control plane controller. OMP is control protocol that is used to exchange the routing, policy, and management information between the controllers and edge routers in the overlay network. Although this disclosure describes sending control messages in a particular manner, this disclosure contemplates sending control messages in any suitable manner.

In particular embodiments, the request sent at step 330 and the response sent at step 360 may be control messages sent over WebSocket. WebSocket is a communications protocol, providing full-duplex communication channels over a single TCP connection. WebSocket enables streams of messages on top of TCP. TCP alone deals with streams of bytes with no inherent concept of a message. Although this disclosure describes sending control messages in a particular manner, this disclosure contemplates sending control messages in any suitable manner.

Figure 4:
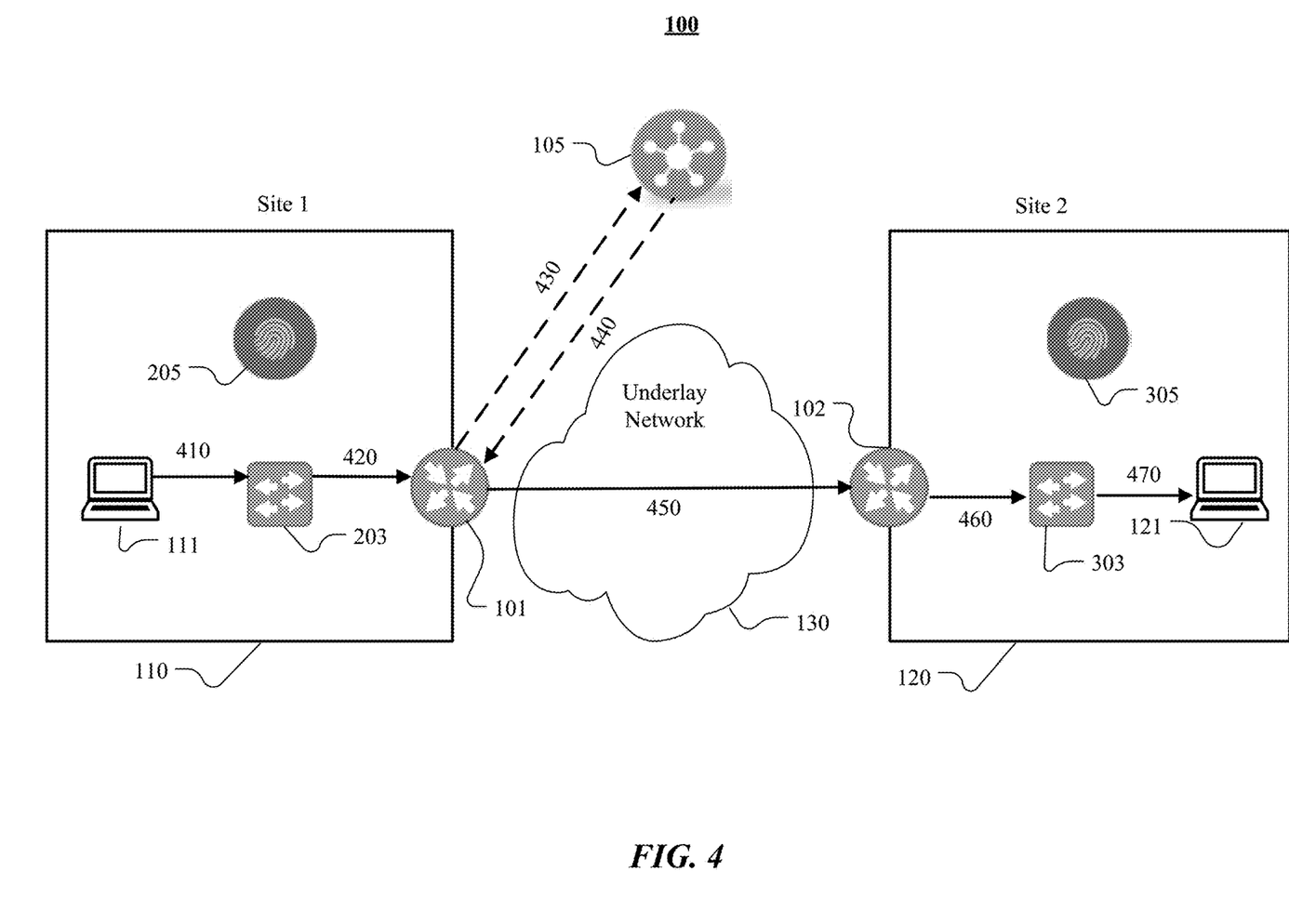
FIG. 4 illustrates an example flow for fetching a destination group from an SD-WAN fabric control plane.

In particular embodiments, the second network apparatus may be an SD-WAN fabric control plane controller 105. The second network apparatus may maintain group identifiers associated with hosts in the network. The source edge router 101 may receive a response comprising the identifier of the second group from the second network apparatus. FIG. 4 illustrates an example flow for fetching a destination group from an SD-WAN fabric control plane. As an example and not by way of limitation, illustrated in FIG. 4, a controller 105 within the SD-WAN fabric control plane may receive information associated with the identifier of the first group associated with the first host 111 from the authentication server 205 in the first site 110 when the first host 111 performs an authentication procedure. The controller 105 may receive information associated with the identifier of the second group associated with the second host 121 from the authentication server 305 in the second site 120 when the second host 121 performs an authentication procedure. When the first host 111 sends a data packet to the second host 121, the data packet may be forwarded to the switch 203 connected to the first host 111 at step 410. The switch 203 may add the identifier of the first group as the source group to the data packet and forward the data packet to the source edge router 101 at step 420. The source edge router 101 may try to determine an identifier for the destination group by looking up the IP address of the second host 121, the destination host, in the local database. If the source edge router 101 fails to find a record for the IP address of the second host 121, the source edge router 101 may send a request to the controller 105 in the SD-WAN fabric control plane at step 430. The request may comprise the IP address of the destination host, i.e., the second host 121. The controller 105 may find an identifier for the second group from its own database. The controller 105 may respond with the identifier for the second group to the source edge router 101 at step 440. The request and the response at step 430 and step 440 may be control plane messages. The source edge router 101 may determine that the second group is the destination group based on the received identifier. The source edge router 101 may determine policies corresponding to the data packet based on the destination group identifier. In particular embodiments, the source edge router 101 may determine policies corresponding to the data packet based on the first group identifier. The source edge router 101 may apply the determined policies to the data packet. At step 450, the source edge router 101 may cause the data packet to be delivered to the destination edge router 102 through the underlay network 130. The destination edge router 102 may try to determine the destination group identifier by looking up the IP address of the destination host, i.e., the second host 121 in its local database. If the destination edge router 102 fails to look up the destination IP address in the local database, the destination edge router 102 may send a request to the controller 105, which is not shown in FIG. 4. The destination edge router 102 may determine policies corresponding to the data packet based on the destination group identifier. In particular embodiments, the destination edge router 102 may determine policies corresponding to the data packet based on the source group identifier. The destination edge router 102 may apply the policies to the data packet. At step 460, the destination edge router 102 may forward the data packet to the switch 303 connected to the second host 121. At step 470, the switch may forward the data packet to the second host 121. Although this disclosure describes fetching a destination group identifier from an SD-WAN fabric control plane in a particular manner, this disclosure contemplates fetching a destination group identifier from an SD-WAN fabric control plane in any suitable manner.

Figure 5:
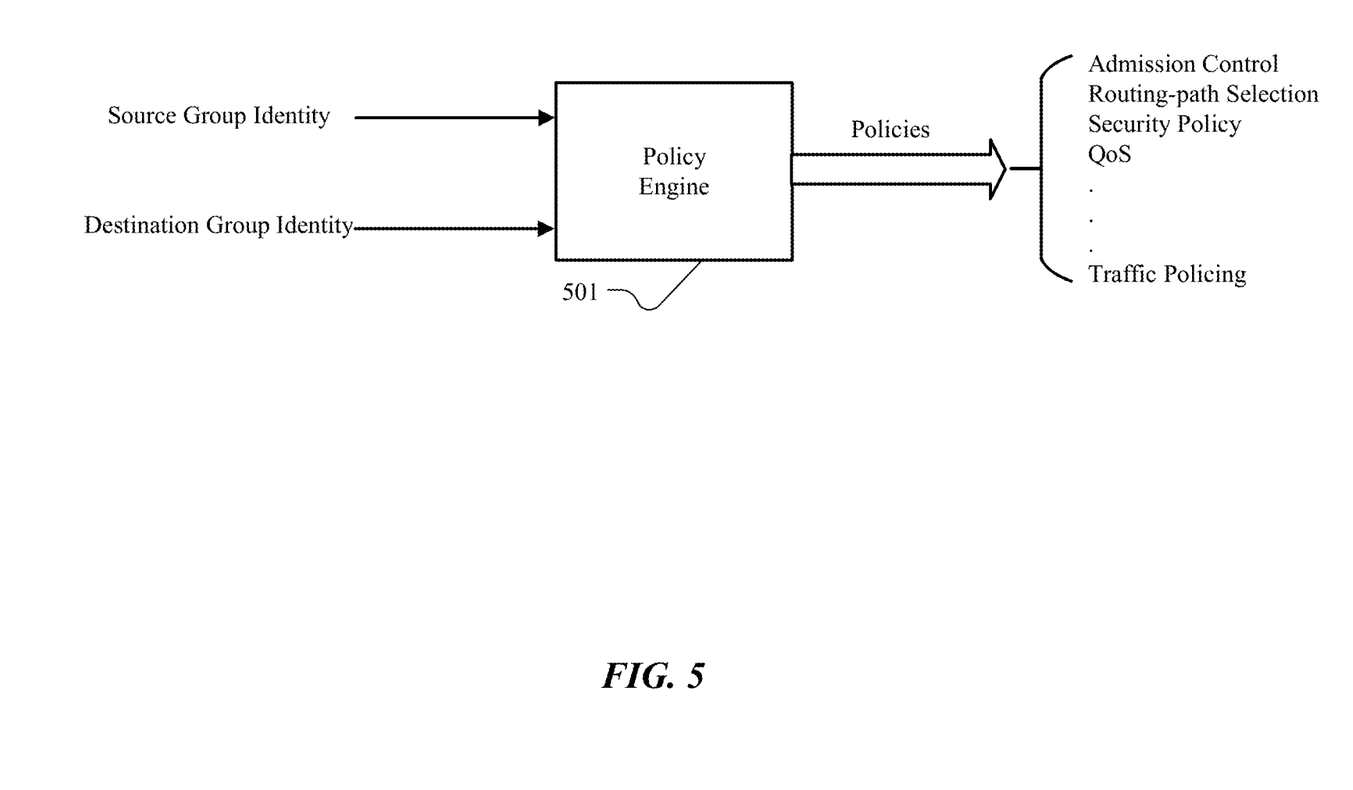
FIG. 5 illustrates an example determination of policies for a data packet.

In particular embodiments, the source edge router 101 may determine one or more policies corresponding to the data packet. In particular embodiments, the one or more policies may be associated with a destination group. In particular embodiments, the one or more policies may be associated with a source group. The source edge router 101 may apply the one or more policies to the data packet. FIG. 5 illustrates an example determination of policies for a data packet. As an example and not by way of limitation, illustrated in FIG. 5, the source edge router 101 may utilize a policy engine 501 to determine one or more policies corresponding to a data packet. In particular embodiments, the policy engine 501 may be within the source edge router 101. In particular embodiments, the policy engine 501 may be located remote from the source edge router 101. The source edge router 101 may provide an identifier for the source group corresponding to the data packet to the policy engine 501 as an input. The source edge router 101 may provide an identifier for the destination group corresponding to the data packet to the policy engine 501 as an input. The policy engine 501 may produce one or more policies corresponding to the data packet. The one or more policies may comprise an admission control, a routing-path selection, security policies, a Quality of Service (QoS) service, and a traffic policing. The source edge router 101 may apply the determined one or more policies to the data packet. Any router in the routing path within the SD-WAN network 100 may determine one or more policies corresponding to the data packet and apply the one or more policies to the data packet. Although this disclosure describes determining one or more policies corresponding to a data packet and applying the policies to the data packet in a particular manner, this disclosure contemplates determining one or more policies corresponding to a data packet and applying the policies to the data packet in any suitable manner.

In particular embodiments, the one or more policies may comprise an admission control. The network 100 may restrict traffic to access the network based on a source group identifier, based on a destination group identifier, or based on a combination of the source group and the destination group. As an example and not by way of limitation, the policy engine 501 may reject the data packet from being routed through the SD-WAN network 100 based on the determined source group identifier and/or the determined destination group identifier. Then, the source router 101 may drop the data packet without causing the data packet to be routed through the SD-WAN network 100. Although this disclosure describes enforcing an admission control policy to a data packet in a particular manner, this disclosure contemplates enforcing an admission control policy to a data packet in any suitable manner.

In particular embodiments, the one or more policies may comprise a routing-path selection. The routing-path selection may be performed based on the destination group identifier. In particular embodiments, the routing-path selection may be performed based on the source group identifier. Dynamic routing may be one of major characteristics of SD-WAN. The source edge router 101 may route the data packet through one of a plurality of available routing paths based on the source group identifier and/or the destination group identifier. As an example and not by way of limitation, the policy engine 501 may generate a routing path for the data packet based on the source group identifier and/or the destination group identifier. The source edge router 101 may cause the data packet to be routed through the generated routing path towards the destination edge router 102. Although this disclosure describes enforcing a routing-path selection based at least on the destination group identifier in a particular manner, this disclosure contemplates enforcing a routing-path selection based at least on the destination group identifier in any suitable manner.

In particular embodiments, the one or more policies may comprise a security policy. The security policy may be determined based on the destination group identifier. In particular embodiments, the security policy may be determined based on the source group identifier. As an example and not by way of limitation, the policy engine 501 may generate a set of firewall rules for the data packet based on the source group identifier and/or the destination group identifier. The source edge router 101 may apply the generated firewall rules to the data packet. In particular embodiments, the source edge router 101 may drop the data packet if the data packet fails to meet the generated firewall rules. Although this disclosure describes enforcing a security policy to a data packet based at least on the destination group identifier in a particular manner, this disclosure contemplates enforcing a security policy to a data packet based at least on the destination group identifier in any suitable manner.

In particular embodiments, the one or more policies may comprise a Quality of Service (QoS) policy. The QoS policy may be determined based on the destination group identifier. In particular embodiments, the QoS policy may be determined based on the source group identifier. A plurality of QoS parameters may be determined based on a QoS class of the data packet. The QoS class may be determined based on the source group identifier and/or the destination group identifier for traffic. As an example and not by way of limitation, the policy engine 501 may determine that the data packet is a best-effort class traffic based on the source group identifier and/or the destination group identifier. The source edge router 101 may apply a plurality of QoS parameters associated with the best-effort class traffic to the data packet. Although this disclosure describes enforcing a QoS policy based at least on the destination group identifier in a particular manner, this disclosure contemplates enforcing a QoS policy based at least on the destination group identifier in any suitable manner.

In particular embodiments, the one or more policies may comprise a traffic policing that may enforce a pre-determined maximum data rate. The pre-determined maximum data rate may be determined based on the destination group identifier. In particular embodiments, the pre-determined maximum data rate may be determined based on the source group identifier. As an example and not by way of limitation, the policy engine 501 may determine that the maximum data rate for the traffic from the first group to the second group is 100 Mbps. The source edge router 101 may enforce the determined maximum data rate for traffic from the first host 111 to the second host 121. Although this disclosure describes enforcing maximum data rate based at least on the destination group identifier in a particular manner, this disclosure contemplates enforcing maximum data rate based at least on the destination group identifier in any suitable manner.

In particular embodiments, the source edge router 101 may cause the data packet to be routed to the second host 121. As an example and not by way of limitation, the source edge router 101 may cause the data packet to be routed to the destination edge router 102 via one of one or more IPSec tunnels between the source edge router 101 and the destination edge router 102 through the underlay network 130. Upon receiving the data packet, the destination edge router 102 may route the data packet toward the second host 121 based on local routing policies in the second site 120. Although this disclosure describes causing a data packet to be routed to a destination host in a particular manner, this disclosure contemplates causing a data packet to be routed to a destination host in any suitable manner.

In particular embodiments, the source edge router 101 may receive a second data packet destined to the first host 111 from the second host 121. The source edge router 101 may identify a source group identifier based on a source group identifier field in the second data packet. In particular embodiments, the source edge router 101 may determine that the source group identifier is not identical to the second group identifier in the record. In response to the determination, the source edge router 101 may update the identifier of the second group in the record with the source group identifier. As an example and not by way of limitation, upon receiving the first data packet from the first host 111, the second host 121 may respond with a second data packet to the first host 111. The second data packet may arrive at the source edge router 101 within the first site 110. The source edge router 101 may determine a source group identifier of the second data packet based on a source group identifier filed in the second data packet. The source edge router 101 may compare the source group identifier of the second data packet with the second group identifier corresponding to the second host 121 in the local database. If the source group identifier does not match the second group identifier in the local database, the source edge router 101 may update the second group identifier in the local database with the source group identifier of the second data packet. Although this disclosure describes updating a group identifier for a remote host based on a data packet originated from the remote host in a particular manner, this disclosure contemplates updating a group identifier for a remote host based on a data packet originated from the remote host in any suitable manner.

Figure 6:
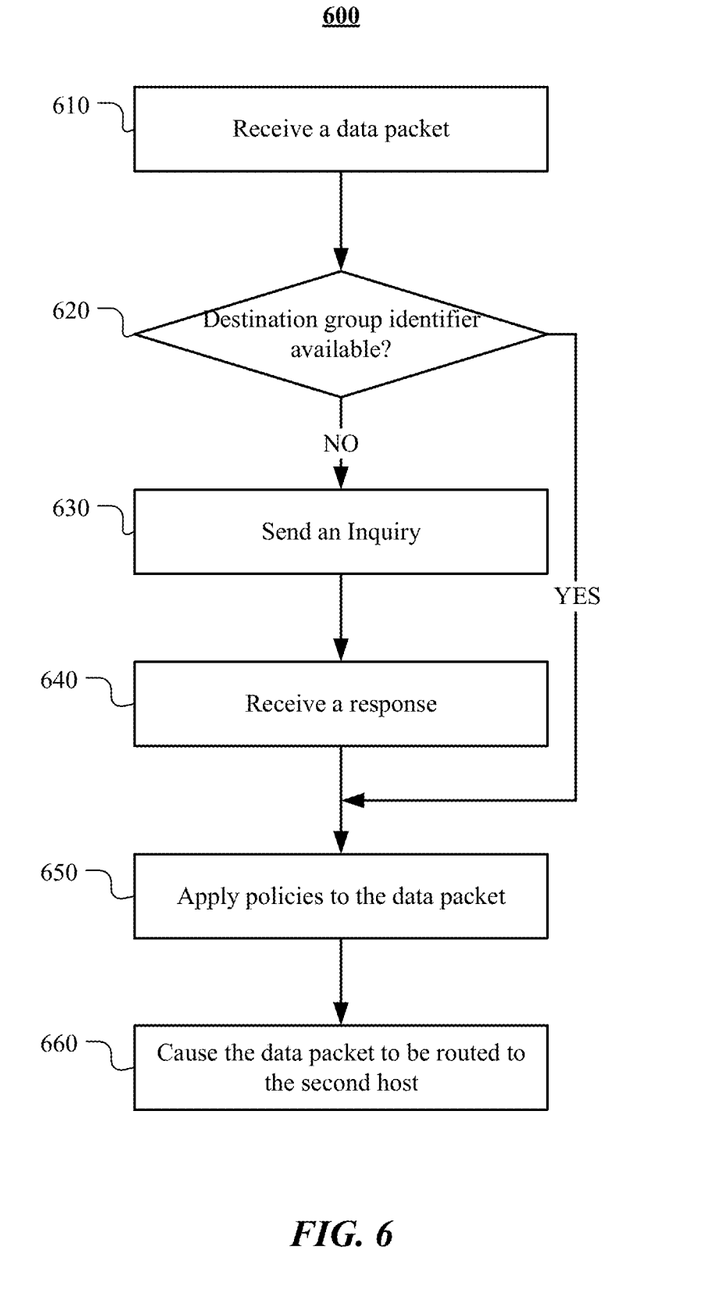
FIG. 6 illustrates an example method for enforcing policies based on a destination group identifier at a SD-WAN edge router.

FIG. 6 illustrates an example method 600 for enforcing policies based on a destination group identifier at a SD-WAN edge router. The method may begin at step 610, where a first network apparatus configured to operate at a first site of a network may receive a data packet destined to a second host located in a second site from a first host located in the first site. The first site and the second site may be different. At step 620, the first network apparatus may determine whether an identifier of a second group to which the second host belongs is available at the first network apparatus. At step 630, the first network apparatus may, in response to the determination, send a request for an identifier of the second group to a second network apparatus. The request may comprise an address of the second host. At step 640, the first network apparatus may receive a response comprising the identifier of the second group from the second network apparatus. The first network apparatus may determine that the second group is a destination group based on the received identifier. At step 650, the first network apparatus may apply one or more policies associated with the destination group to the data packet. At step 660, the first network apparatus may cause the data packet to be routed to the second host. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for enforcing policies based on a destination group identifier at a SD-WAN edge router including the particular steps of the method of FIG. 6, this disclosure contemplates any suitable method for enforcing policies based on a destination group identifier at a SD-WAN edge router including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Systems and Methods

Figure 7:
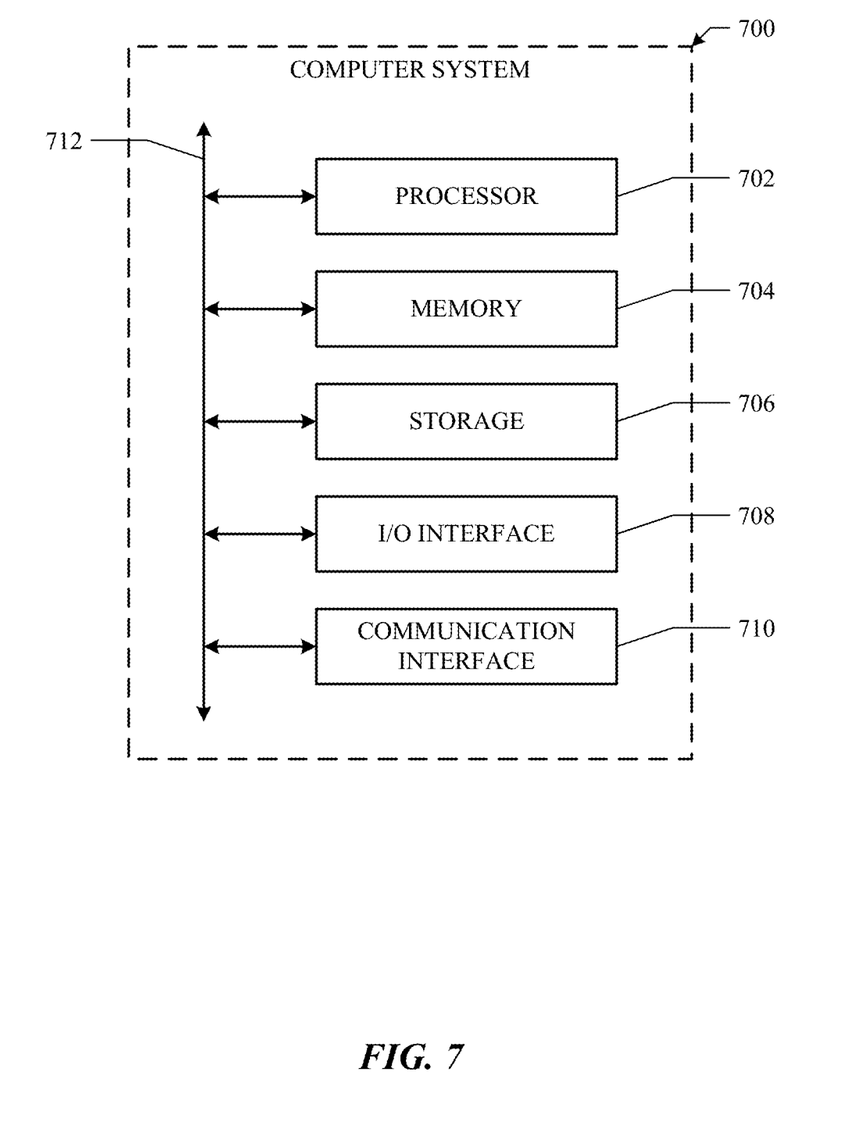
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate.

In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular

What is claimed is:

1. A method comprising, by a first network apparatus configured to operate at a first site of a network:
receiving, from a first host located in the first site, a data packet destined to a second host located in a second site, wherein the first site and the second site are different, wherein each host is configured to be associated with a group of hosts by a corresponding authentication server, wherein the data packet from the first host comprises an identifier of a first group that is added by a switch connected to the first host on a local area network, wherein a first authentication server configured the first host to be associated with the first group, and wherein the switch determines the identifier of the first group associated with the first host based on an Extensible Authentication Protocol (EAP)-Success message received from the first authentication server;
determining, based on the identifier of the first group in the data packet, that the first group is a source group;
sending, to a second network apparatus, a request for an identifier of a second group that a second authentication server configured the second host to be associated with, wherein the request comprises an address of the second host;
in response to sending the request for the identifier of the second group, receiving, from the second network apparatus, a response comprising the identifier of the second group;
determining, based on the received identifier, that the second group is a destination group;
applying, to the data packet, one or more policies determined based on a combination of the source group and the destination group; and
causing the data packet to be routed to the second host.

2. The method of claim 1, wherein the first network apparatus is a Wide Area Network (WAN)-edge router connected to the network, and wherein the network is a Software-Defined (SD)-WAN comprising a plurality of sites.

3. The method of claim 1, wherein the switch connected to the first host learns the identifier of the first group during an authentication process of the first host.

4. The method of claim 1, wherein the one or more policies comprise at least one of an admission control, a routing-path selection, a security policy, or a Quality of Service (QoS) policy.

5. The method of claim 1, wherein the one or more policies comprise a traffic policing, and wherein a predetermined maximum data rate is enforced.

6. The method of claim 1, further comprising:
determining that the identifier of the second group is not available at the first network apparatus.

7. The method of claim 6, wherein determining that the identifier of the second group is not available comprises searching a local database at the first network apparatus.

8. The method of claim 1, wherein the request is a control message sent over Overlay Management Protocol (OMP).

9. The method of claim 1, wherein the request is a control message sent over Web Socket.

10. The method of claim 1, wherein the second network apparatus is a WAN fabric control plane, and wherein the second network apparatus maintains group identifiers associated with hosts in the network.

11. The method of claim 1, wherein the second network apparatus is a WAN-edge router configured to operate at the second site.

12. The method of claim 11, wherein the second network apparatus determines the identifier of the second group by communicating with a local fabric control plane associated with the second site.

13. The method of claim 1, further comprising:
receiving, from the second host, a second data packet destined to the first host;
identifying a source group identifier based on a source group identifier field in the second data packet;
determining that the source group identifier is not identical to the identifier of the second group in a local database; and
in response to the determination, updating the identifier of the second group in the record with the source group identifier.

14. A first network apparatus that is configured to operate at a first site of a network comprising:
one or more processors; and
one or more computer-readable non-transitory storage media coupled to one or more of the processors and comprising instructions operable when executed by one or more of the processors to cause the first network apparatus to:
receive, from a first host located in the first site, a data packet destined to a second host located in a second site, wherein the first site and the second site are different, wherein each host is configured to be associated with a group of hosts by a corresponding authentication server, wherein the data packet from the first host comprises an identifier of a first group that is added by a switch connected to the first host on a local area network, wherein a first authentication server configured the first host to be associated with the first group, and wherein the switch determines the identifier of the first group associated with the first host based on an Extensible Authentication Protocol (EAP)-Success message received from the first authentication server;
determine, based on the identifier of the first group in the data packet, that the first group is a source group;
send, to a second network apparatus, a request for an identifier of a second group that a second authentication server configured the second host to be associated with, wherein the request comprises an address of the second host;
in response to sending the request for the identifier of the second group, receive, from the second network apparatus, a response comprising the identifier of the second group;
determine, based on the received identifier, that the second group is a destination group;
apply, to the data packet, one or more policies determined based on a combination of the source group and the destination group; and
cause the data packet to be routed to the second host.

15. The first network apparatus of claim 14, wherein the first network apparatus is a WAN-edge router connected to the network, and wherein the network is a SD-WAN comprising a plurality of sites.

16. The first network apparatus of claim 14, wherein the one or more policies comprise at least one of an admission control, a routing-path selection, a security policy, or a Quality of Service (QoS) policy.

17. The first network apparatus of claim 14, wherein one or more of the processors are further operable when executing the instructions to:
- receive, from the second host, a second data packet destined to the first host;
- identify a source group identifier based on a source group identifier field in the second data packet;
- determine that the source group identifier is not identical to the identifier of the second group in a local database; and
- in response to the determination, update the identifier of the second group in the record with the source group identifier.

18. One or more computer-readable non-transitory storage media embodying software that is operable on a first network apparatus configured to operate at a first site of a network when executed to:
- receive, from a first host located in the first site, a data packet destined to a second host located in a second site, wherein the first site and the second site are different, wherein each host is configured to be associated with a group of hosts by a corresponding authentication server, wherein the data packet from the first host comprises an identifier of a first group that is added by a switch connected to the first host on a local area network, wherein a first authentication server configured the first host to be associated with the first group, and wherein the switch determines the identifier of the first group associated with the first host based on an Extensible Authentication Protocol (EAP)-Success message received from the first authentication server;
- determine, based on the identifier of the first group in the data packet, that the first group is a source group;
- send, to a second network apparatus, a request for an identifier of a second group that a second authentication server configured the second host to be associated with, wherein the request comprises an address of the second host;
- in response to sending the request for the identifier of the second group, receive, from the second network apparatus, a response comprising the identifier of the second group;
- determine, based on the received identifier, that the second group is a destination group;
- apply, to the data packet, one or more policies determined based on a combination of the source group and the destination group; and
- cause the data packet to be routed to the second host.

19. The one or more computer-readable non-transitory storage claim 18, wherein the first network apparatus is a WAN-edge router connected to the network, and wherein the network is a SD-WAN that comprises a plurality of sites.

* * * * *